3,098,833
ORGANOPOLYSILOXANE EMULSION CONTAINING A CURING CATALYST COMPRISING ZINC STEARATE, A METAL SALT AND AN ALKANOLAMINE-FATTY ACID CONDENSATE
Michael M. Solomon, Albany, N.Y., assignor to General Electric Company, a corporation of New York
No Drawing. Filed Nov. 27, 1959, Ser. No. 855,514
2 Claims. (Cl. 260—18)

This invention relates to a catalyst emulsion for use in curing curable organopolysiloxanes and to the process for rendering cellulosic materials water-repellent with aqueous organopolysiloxane fluid emulsions containing the aforesaid catalyst emulsion.

Treatments for rendering textile fabrics and paper water-repellent have long been known in the art and a number of organic and inorganic materials have been employed for this purpose. While many of these materials give some water-repellency to the treated materials, most of the prior art materials have been deficient in providing the desired degree of water-repellency.

One class of materials which has been quite effective in preparing water-repellent textile fabrics are the various organopolysiloxanes, commonly referred to as silicone fluids. While these silicone fluids, when successfully applied to the surface of the fibers of textile fabrics, impart very satisfactory water-repellency to the fabrics, there have been a number of difficulties encountered in the attempted application of these silicone fluids to the fabrics. To impart water-repellency to a textile fabric, the silicone fluids must first be applied to the surface of the fabric and then subsequently cured. To provide an economical process for the application of silicone fluids to these fabrics it is necessary for the silicone fluids to be applied from a treating bath which has a shelf-life or bath-life in excess of several eight hour shifts.

It has long been known that curable organopolysiloxane fluids can be cured with various metal soaps such as the zinc, tin, lead and iron salts of various fatty acids. With those metal salts which are operative to cure organopolysiloxanes, a severe problem of bath-life is encountered. With most of these salts, bath-lives in excess of about 5 to 6 hours are impossible to obtain. Accordingly, when many of these salts have been employed as curing catalysts for silicones in water-repellency textile applications, it has been necessary to change the treating baths in the middle of a shift, resulting in an obvious economic loss of time as well as material. Among the metal salts which have been suggested for use as curing catalysts for silicones in aqueous silicone emulsions is zinc stearate. While it would be expected that zinc stearate would be an excellent catalyst for a curing of curable organopolysiloxanes, zinc stearate has been very ineffective as a catalyst for the curing of silicones in aqueous silicone emulsions.

The present invention is based on my discovery of a catalyst emulsion in which zinc stearate is the catalyst and in which the catalyst emulsion can be used as a catalyst for an aqueous emulsion of a curable organopolysiloxane fluid with a bath-life in excess of 3 to 5 days. The zinc stearate catalyst emulsion of the present invention is unique and its operativeness is surprising in view of the fact that minor modifications of the emulsion results in emulsions which are either unsatisfactory for curing aqueous silicone fluid emulsions or result in treating baths which have a bath-life of less than 8 hours. For example, when zinc octoate is substituted for the zinc stearate employed in the practice of the present invention, the resulting treating bath has a shelf-life of only 4 to 5 hours. Similarly, when tin oleate is substituted for the zinc stearate employed in the practice of the present invention, it is again found that the bath-life is only 4 to 5 hours which is much too short for economic operation in a textile water-repellency process.

The essential ingredients of the catalyst emulsion of the present invention, in addition to the zinc stearate, include an inorganic salt and an emulsifier of the alkanolamine-fatty acid condensation type. These three essential ingredients are employed in the form of an emulsion in water. These three essential components are unique in providing a catalyst emulsion which is sufficiently active to cure curable fluid organopolysiloxanes on textile fabrics and are also unique in providing a bath-life of at least 3 to 5 days. When, for example, the metal salt is eliminated from the catalyst emulsion, it is found that the resulting system is operative to form stable aqueous silicone fluid emulsion treating baths but is not operative to catalyze the curing of curable organopolysiloxane fluids. When one of the other common emulsifiers is substituted for the alkanolamine-fatty acid condensate employed in the practice of the present invention, it is found that the zinc stearate is not sufficiently active when employed in a silicone-water emulsion to cause curing of the curable organopolysiloxane fluid in the emulsion.

In addition to the three essential ingredients described above, the catalyst emulsion of the present invention can also contain any of the common viscosity control additives usually employed with aqueous silicone fluid emulsions. These viscosity control additives have a tendency to stabilize the viscosity of the aqueous silicone emulsion treating baths and to maintain the baths at a relatively low viscosity. Among the various viscosity control additives which can be employed in the practice of the present invention can be mentioned, for example, any of the common non-ionic emulsifying agents such as the polyoxyethylated nonyl phenols made by the chemical reaction of 1 mole of nonyl phenol with from about 1.5 to 30 moles of ethylene oxide, which products are available commercially as Igepal surfactants. Another of the satisfactory non-ionic viscosity control additives are the trimethyl nonyloxyethyleneoxy ethanols prepared by reacting from about 2 to 12 moles of ethylene oxide with trimethyl nonyl alcohol. One of such products is commercially available as Tergitol TMN surfactants.

The essential ingredients in the catalyst emulsion of the present invention are preferably present in the amounts of from 3 to 15 parts by weight of metal salt and from about 5 to 30 parts by weight of the alkanolamine-fatty acid condensate per 100 parts of zinc stearate.

The metal salt employed in the practice of the present invention can be of almost any variety, including both inorganic metal salts and simple organic metal salts. No limitation has been found as to the nature of the metal ion in these metal salts. Metal salts containing aluminum, zinc, sodium, iron, cobalt, barium, potassium, etc, have been found to be operative in the practice of the present invention. The anion of the metal salt can also vary within wide limits with suitable anions including the nitrate group, the sulfate group, the chloride group, the acetate radial, etc. While a broad class of metal salts are operative as one of the essential ingredients of the catalyst emulsion of the present invention, it is preferred to employ metal salts selected from the class consisting of aluminum nitrate, basic aluminum acetate, zinc nitrate, zinc acetate, and sodium sulfate. The two preferred metal salts employed in the practice of the present invention are aluminum nitrate and zinc nitrate, with aluminum nitrate being the most preferred.

The alkanolamine-fatty acid condensates employed in the practice of the present invention as an essential ingredient in the catalyst emulsion are also well known in the art and are commercially available materials as exemplified by a material known as Drew 1011. These products are prepared by condensing either a monalkanolamine or a dialkanolamine with a fatty acid by means well known to the art. In general, the monoalkanolamine and dialkanolamine employed in the condensation reaction contain alkanol groups of from 1 to 6 carbon atoms. Illustrative of the various monoalkanol and dialkanol amines which can be employed in forming the condensation product with the fatty acid can be mentioned, for example, methanolamine, diethanolamine, butanolamine, dihexanolamine, etc.

The fatty acids with which the alkanolamine is condensed is one of the well known class of fatty acids which generally are monobasic acids containing an even number of carbon atoms from 12 carbon atoms to about 20 carbon atoms. Specific examples of these fatty acids include lauric aric, myrtistic acid, palmitic acid, stearic acid, and arachidic acid.

Specific examples of the alkanolamine-fatty acid condensate employed as an essential ingredient in the catalyst emulsion of the present invention include, for example, the condensation product of lauric acid and diethanolamine, the condensation product of stearic acid and monopropanolamine. It is, of course, understood that the condensation product of the alkanolamine and the fatty acid is an amide.

The catalyst emulsion is prepared by adding sufficient amounts of the three essential ingredients in the ratios described above to water to provide from 1 to 30 parts by weight of zinc stearate per 100 parts of the catalyst emulsion. This catalyst emulsion is emulsified in any suitable manner such as by passing the water and the three essential ingredients through a colloid mill set at a low clearance, such as a clearance of from about 0.005 to 0.020 inch.

The catalyst emulsion is then added to an aqueous emulsion of a curable silicone in sufficient amount to provide from about 1 to 20 percent zinc stearate based on the weight of the organopolysiloxane in the emulsion. This results in a treating bath containing both a curable organopolysiloxane and a curing catalyst. This treating bath is then used to treat, by conventional means, various materials which it is desired to render water-repellent. For example, textile fabrics can be padded in this bath and paper products can be passed through the bath. After coating the material to be rendered water-repellent with the treating solution, the coated or treated product is then heated at an elevated temperature to evaporate the water and to cure the organopolysiloxane. In general, it is preferred to employ curing temperatures of the order of 125 to 175° C. for times of from 1 to 10 minutes to effect cure of the curable organopolysiloxane.

The aqueous emulsion of curable organopolysiloxane fluid employed in the practice of the present invention is also well known in the art and merely comprises a curable organopolysiloxane, water, and an emulsifying agent which is capable of emulsifying the first two ingredients.

The curable organopolysiloxanes per se are also well known in the art and generally comprise those fluid type organopolysiloxanes which contain silicon-bonded hydrogen or silicon-bonded hydroxyl groups in the organopolysiloxane chain. These curable organopolysiloxanes can be best described by reference to the following formula:

(1) 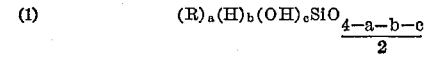

where $a$ has a value of from 1.0 to 2.0, inclusive, $b$ has a value of from 0 to 1.0, inclusive, $c$ has a value of from 0 to 0.4, inclusive, the sum of $b$ plus $c$ is equal to from 0.01 to 1.4, inclusive, and the sum of $a$ plus $b$ plus $c$ is equal to from 2 to 3, inclusive, and R represents members selected from the class consisting of monovalent hydrocarbon radicals, halogenated monovalent hydrocarbon radicals, and cyanoalkyl radicals. In the preferred embodiment of my invention, the R group in the curable organopolysiloxane of Formula 1 is methyl. However, it should be understood that in addition to methyl, the monovalent hydrocarbon radicals designated by R can be other alkyl radicals, e.g., ethyl, propyl, octyl, etc. radicals; aryl radicals, e.g., phenyl, naphthyl, tolyl, xylyl, etc. radicals; arylkyl radicals, e.g., benzyl, phenylethyl, etc. radicals; halogenated alkyl and aryl radicals, e.g., chloromethyl, beta-chloro methyl, chlorophenyl, tetrachlorophenyl, etc. radicals; and cyanoalkyl radicals, e.g., cyanomethyl, beta-cyano methyl, beta-cyanopropyl, gamma-cyanopropyl, etc. radicals.

The curable organopolysiloxane fluids of Formula 1 can consist of homopolymers of various siloxane units, copolymers of various siloxane units, as well as mixtures of various types of homopolymers or copolymers. For example, those organopolysiloxane fluids within the scope of Formula 1 which contain silicon-bonded hydrogen atoms can be prepared by the hydrolysis of methyl hydrogen dischlorosilane alone or in combination with other organochlorosilanes, such as trimethylchlorosilane, dimethyldichlorosilane and methyltrichlorosilane. Those organopolysiloxanes within the scope of Formula 1 containing silicon-bonded hydroxyl groups can be prepared, for example, by effecting reaction between a trimethylsilyl chain-stopped dimethylsiloxane copolymer and steam in the presence of an acidic or basic material such as sulfuric acid or sodium hydroxide. The steam will tend to rupture siloxane linkages and form organopolysiloxane chains which are terminated with silicon-bonded hydroxyl groups. Furthermore, those organopolysiloxanes within the scope of Formula 1 containing silicon-bonded hydroxyl groups in chain terminating positions can be prepared by the hydrolysis of one or more diorganosiloxanes which are substantially free of triorganosiloxane components. In this situation the water present during the hydrolysis will tend to form silanol groups at the end of the chains.

Also within the scope of the organopolysiloxanes used in the practice of the present invention are mixtures of various organopolysiloxanes in which up to about 65 mole percent of the organopolysiloxane chains are free of silicon-bonded hydroxyl groups and silicon-bonded hydrogen atoms. For example, within the scope of Formula 1 is a blend of a trimethylsilyl chain-stopped methyl hydrogen polysiloxane with a trimethylsilyl chain-stopped dimethylpolysiloxane so long as no more than 65 percent of the organopolysiloxane molecules in the blend are free of silicon-bonded hydrogen or silicon-bonded hydroxyl groups.

The aqueous emulsion of the curable organopolysiloxane within the scope of Formula 1 is prepared by mixing the organopolysiloxane of Formula 1 with the desired amount of water in the presence of a suitable emulsifying agent. The ratio of water to organopolysiloxane fluid can vary within extremely wide limits. As a practical matter, commercial organopolysiloxane emulsions are generally concentrated and contain up to about 60 or 70 weight percent of organopolysiloxane. These concentrates are then diluted with additional water by the user to provide organopolysiloxane emulsions containing as little as 1 to 2 percent by weight of silicone fluid. Accordingly, the emulsions within the scope of the present invention which can be cured by the catalyst emulsion of the present invention, include those silicone fluid emulsions containing from about 1 to 70 percent by weight of silicone. In general, these emulsions contain about 1, for example, from about 0.5 to 5 percent by weight of emulsifying agent.

As mentioned above, the emulsifying agent which can be employed to form the organopolysiloxane emulsion is not critical and can vary within extremely wide limits. The emulsifying agents suitable for forming organopolysiloxane emulsions are any of those emulsifying agents previously mentioned as non-ionic emulsifying agents which can be used as viscosity control additives in the catalyst emulsion as well as the alkanolamine-fatty acid condensate emulsifying agent. Furthermore, other emulsifying agents which are satisfactory in the process of the present invention include, for example, polyoxyalkylene-fatty acid condensates, polyoxyalkylene-fatty alcohol condensates, polyoxyalkylene-phenol condensates, polyoxyalkylene-substituted phenol condensates, polyoxyalkylene-amide condensates, polyoxyalkylene-amine condensates, polyoxyalkylene block polymers, glyceryl esters of fatty acids, etc. More specific emulsifying agents useful in the practice of my invention include, for example, glyceryl monostearate, polyoxyethylene stearate, polypropylene glycol monolaurate, polyvinyl alcohols, the isooctylphenyl ether of polyethylene glycols, polyoxyethylated nonyl phenols, triethanol ammonium stearate, sulfonated oils, sodium lauroyl monoglyceride sulfate, sulfonated alkyl naphthalenes, cetyl pyridinium chloride, lauroyl diethanolamine, lauroyl trimethyl ammonium chloride, carboxy methyl cellulose, etc.

To form the organopolysiloxane fluid emulsion, the organopolysiloxane fluid within the scope of Formula 1, the water, and the emulsifying agent are merely mixed together and then agitated, for example by colloid milling, until the emulsion is formed.

The following examples are illustrative of the practice of my invention and are not intended for purposes of limitation. All parts are by weight.

*Example 1*

To 136 parts water was added 6 parts of diethanol lauramide, 15 parts of a 5 percent solution of the reaction product of 6 moles of ethylene oxide and 1 mole of nonyl phenol as a viscosity control additive, 3 parts of aluminum nitrate nonahydrate, and 40 parts zinc stearate. These ingredients were mixed for 30 minutes and the entire mixture was then passed through a colloid mill to produce a catalyst emulsion within the scope of the present invention. A padding bath was prepared by mixing 5 parts of this catalyst emulsion with 587.5 parts water and 7.5 parts of an aqueous silicone fluid emulsion. The silicone fluid emulsion was prepared from 30 parts of a linear trimethylsilyl chain-stopped dimethylpolysiloxane fluid, 30 parts of a linear trimethylsilyl chain-stopped methyl hydrogen polysiloxane, 29 parts water and 1 part of the reaction product of 6 moles of ethylene oxide with 1 mole of nonyl phenol. Rayon cloth and rayon gabardine cloth was padded through this bath right after the bath was formed and cured at 150° C. for 5 minutes. After this cure the initial spray rating of both the rayon and rayon gabardine cloth was determined by the procedure described in the 1945 Yearbook of the American Association of Textile Chemists and Colorists, vol. XX, pages 229 to 233. The initial spray rating of both of these fabrics was 100 which is a perfect spray rating. After 5 days this padding bath was still in fluid condition and satisfactory for rendering additional fabrics water-repellent. No gelation of the organopolysiloxanes in the bath had occurred.

*Example 2*

When the procedure of Example 1 was repeated employing tin octoate instead of zinc stearate in the catalyst emulsion, a padding bath resulted which had a shelf-life of only 2 to 3 hours. When fabrics were padded in the fresh bath and cured under the same conditions as in Example 1, the initial spray rating was 100. When the bath was 4 hours old, padded fabrics had a spray rating of zero.

*Example 3*

When the procedure of Example 1 was repeated except that zinc octoate was employed instead of zinc stearate in the catalyst emulsion and the padding bath was prepared, the bath had a life of only about 7 hours. In addition, rayon fabric treated with the fresh bath and cured as in Example 1, had an initial spray rating of less than 80. A zero spray rating was obtained in an eight hour old bath.

*Example 4*

The procedure of Example 1 was repeated except that the aluminum nitrate was omitted from the catalyst emulsion. The padding bath prepared in accordance with the procedure of Example 1 had an excellent shelf-life but was highly inactive since cotton fabric treated with the padding bath and cured for 5 minutes at 150° C. exhibited an initial spray rating of less than 50, indicating that the zinc stearate was in an inactive form and was not acting as a catalyst for the curing of the fluid organopolysiloxane.

*Example 5*

The procedure of Example 1 was repeated except that the diethanol lauramide was omitted from the catalyst emulsion. Again the padding bath resulting from the following of the procedure of Example 1 was quite stable. However, a rayon gabardine fabric treated with this padded bath and cured for 5 minutes at 150° C. exhibited an initial spray rating of less than 50, again indicating that the zinc stearate was not operating to catalyze the cure of the curable organopolysiloxane fluid in the padding bath.

*Example 6*

A catalyst emulsion was prepared by mixing 100 parts zinc stearate, 3 parts zinc nitrate, 5 parts of monopropanol stearamide and 330 parts water. These ingredients were stirred for 5 minutes and then passed through a colloid mill resulting in a catalyst emulsion. Five parts of this catalyst emulsion was added to 50 parts of an aqueous curable silicone emulsion and 1000 parts water. The aqueous silicone emulsion was prepared from 1 part of a sulfonated octyl benzene emulsifying agent, 50 parts water, 30 parts of a trimethylsilyl chain-stopped methyl hydrogen polysiloxane which was a copolymer of 96 mole percent methyl hydrogen siloxane units and 4 mole percent trimethylsiloxane units, and 20 parts of a copolymeric silicone fluid containing 3 mole percent trimethylsiloxane units, 77 mole percent dimethylsiloxane units, 3 mole percent methylsiloxane units, and 17 mole percent of methyl hydroxyl siloxane units. The organo-polysiloxanes in this aqueous emulsion contained an average of 1.36 silicon-bonded methyl groups, 0.60 silicon-bonded hydrogen groups per silicon atom and 0.06 silicon-bonded hydroxyl groups per silicon atom. When a cotton fabric was padded in this bath and heated for 5 minutes at 180° C., a material was produced which had an initial spray rating of 100. When a sheet of parchment paper was dipped in this bath and heated at a temperature of 115° C. for 15 minutes and then dipped in water, the parchment sheet was not wet by the water. This bath had a shelf-life in excess of 4 days.

*Example 7*

A catalyst emulsion was prepared by mixing 100 parts zinc stearate, 15 parts sodium sulfate, 30 parts of dipropanol arachidamide and 10,000 parts water and colloid milling the mixture. 20 parts of this catalyst emulsion were added to 1 part of a silicone fluid emulsion to form a padding bath. This silicone fluid emulsion was prepared by mixing 1 part polyvinyl alcohol with 69 parts water and 30 parts of a trimethylsilyl chain-stopped methylpolysiloxane fluid having a viscosity of about 50 centistokes at 25° C. and which contained about 4 mole percent trimethylsiloxane units and 96 mole percent methyl hydrogen polysiloxane units. A rayon fabric was dipped into this padding bath and heated at a temperature of 130° C. for 5 minutes and its initial spray rating was determined to be 100. When kraft paper was dipped into this padding bath and heated at 150° C. for 5 minutes, the paper was found to be water-repellent. This padding bath had a shelf-life in excess of 5 days.

While a number of specific embodiments of my invention have been described in the examples, it should be understood that the present invention relates broadly to the catalyst emulsion described and to the use of this catalyst in the preparation of compositions adapted to render various cellulosic materials water-repellent and to the rendering of such cellulosic materials water-repellent by these compositions.

The catalyst emulsion of the present invention comprises water, zinc stearate, a metal salt, and an alkanolamine-fatty acid condensation product. More particularly, the essential ingredients of this catalyst emulsion are present in the ratio of 100 parts zinc stearate, from 3 to 15 parts metal salt and from 5 to 30 parts of alkanolamine-fatty acid condensation product. The catalyst emulsion also contains water in sufficient amount to provide from 1 to 30 parts zinc stearate per 100 parts of aqueous catalyst emulsion. This catalyst is adaptable for the curing of aqueous emulsions of curable fluid organopolysiloxanes and is added to these aqueous emulsions of curable organopolysiloxanes by merely mixing the catalyst emulsion with the organopolysiloxane emulsion. These catalysts are curable at temperatures of the order of from 110 to 180° C. and the shelf-life of the catalyzed aqueous organopolysiloxane emulsions are of the order of more than 4 to 5 days.

What I claim as new and desire to secure by Letters Patent of the United States is:

1. The process for preparing a catalyzed organopolysiloxane emulsion which comprises adding to an aqueous emulsion consisting essentially of water and a curable organopolysiloxane fluid a catalyst emulsion consisting essentially of zinc stearate, a metal salt, the cation of which is selected from the group consisting of aluminum, zinc sodium, iron, cobalt, barium, and potassium, and the anion of which is selected from the group consisting of nitrate, sulfate, chloride, and acetate, and an alkanolamine-fatty acid condensation product, said curable organopolysiloxane fluid having the formula

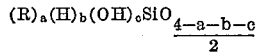

where R is a member selected from the class consisting of monovalent hydrocarbon radicals, halogenated monovalent hydrocarbon radicals and cyanoalkyl radicals, $a$ has a value of from 1.0 to 2.0, inclusive, $b$ has a value of from 0 to 1.0, inclusive, $c$ has a value of from 0 to 0.4, inclusive, the sum of $b$ plus $c$ is equal to from 0.01 to 1.4, inclusive, and the sum of $a$ plus $b$ plus $c$ is equal to from 2 to 3, inclusive.

2. The process for preparing a catalyzed organopolysiloxane emulsion which comprises adding to an aqueous emulsion consisting essentially of water and a curable organopolysiloxane fluid an aqueous catalyst emulsion consisting essentially of 100 parts by weight zinc stearate, from 3 to 15 parts by weight of a metal salt, the cation of which is selected from the group consisting of aluminum, zinc, sodium, iron, cobalt, barium, and potassium, and the anion of which is selected from the group consisting of nitrate, sulfate, chloride, and acetate, and from 5 to 30 parts by weight of an alkanolamine-fatty acid condensation product, said curable organopolysiloxane fluid having the formula

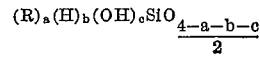

where R is a member selected from the class consisting of monovalent hydrocarbon radicals halogenated monovalent hydrocarbon radicals and cyanoalkyl radicals, $a$ has a value of from 1.0 to 2.0, inclusive, $b$ has a value of from 0 to 1.0, inclusive, $c$ has a value of from 0 to 0.4, inclusive, and the sum of $b$ plus $c$ is equal to from 0.01 to 1.4, inclusive, and the sum of $a$ plus $b$ plus $c$ is equal to from 2 to 3, inclusive.

References Cited in the file of this patent
UNITED STATES PATENTS

| | | |
|---|---|---|
| 2,757,152 | Solomon | July 31, 1956 |
| 2,839,429 | Marsh et al. | June 17, 1958 |
| 2,854,424 | Solomon et al. | Sept. 30, 1958 |